No. 726,266. PATENTED APR. 28, 1903.
B. F. DE COSTA.
MOUNTING OF THE CUTTING BEDS FOR PAPER CUTTING MACHINES.
APPLICATION FILED JUNE 26, 1902.
NO MODEL.
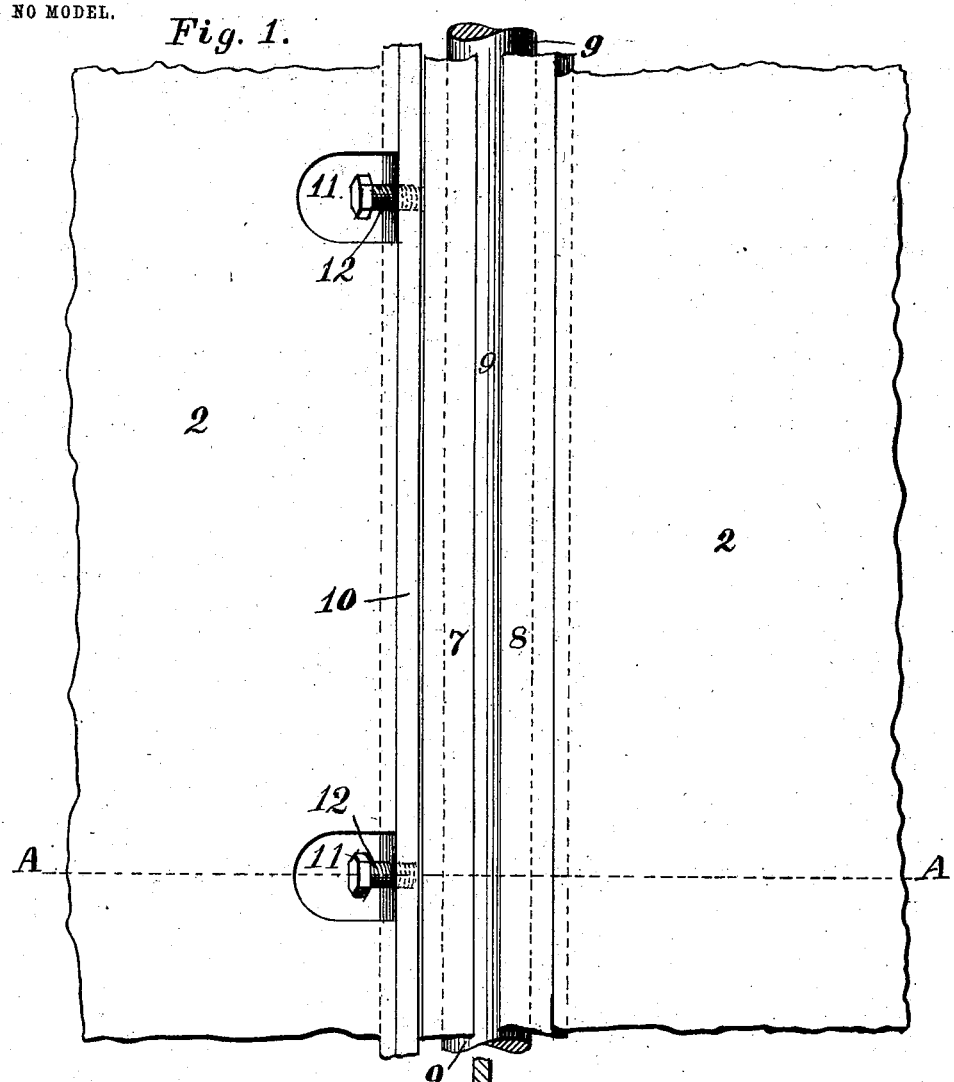
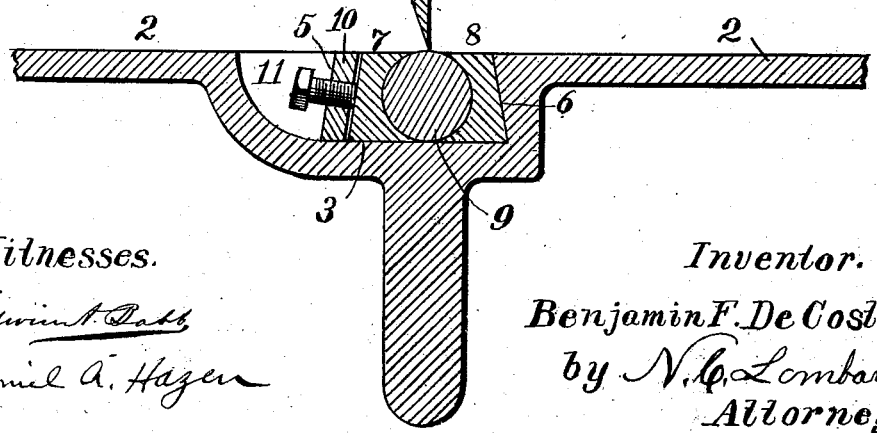
Witnesses.
Edwin A. Babb
Daniel A. Hazen
Inventor.
Benjamin F. De Costa.
by N. C. Lombard
Attorney.

UNITED STATES PATENT OFFICE.

BENJAMIN F. DE COSTA, OF BOSTON, MASSACHUSETTS, ASSIGNOR TO THE HIGHLAND MACHINE CO., OF BOSTON, MASSACHUSETTS, A FIRM.

MOUNTING OF THE CUTTING-BEDS FOR PAPER-CUTTING MACHINES.

SPECIFICATION forming part of Letters Patent No. 726,266, dated April 28, 1903.

Application filed June 26, 1902. Serial No. 113,378. (No model.)

*To all whom it may concern:*

Be it known that I, BENJAMIN F. DE COSTA, of Boston, in the county of Suffolk and State of Massachusetts, have invented certain new and useful Improvements in the Mounting of the Cutting-Beds for Paper-Cutting Machines, of which the following, taken in connection with the accompanying drawings, is a specification.

My invention relates to an improvement in the mounting of the cutting-beds for paper-cutting machines; and it consists in certain novel features of construction, arrangement, and combination of parts, which will be readily understood by reference to the description of the accompanying drawings and to the claims hereto appended and in which my invention is clearly pointed out.

Figure 1 of the drawings is a plan of a portion of the cutting-table of a paper-cutting machine, illustrating my invention. Fig. 2 is a vertical section of the same, the cutting plane being on line A A on Fig. 1.

In paper-cutting machines it is necessary that the table should be provided beneath the knife with a suitable material for the knife to cut upon that will not dull or otherwise injure the knife and at the same time may be adjusted to bring different portions of said material beneath the knife-edge, so as to increase the durability of said knife-receiving material. Various devices have been used for this purpose, and among them a cylindrical-rod of wood has been employed, said rod being set in a suitably-shaped recess or cavity in the upper surface of the table with the upper portion of its periphery on a level with or very slightly above the level of the upper surface of the table. The object of making the cutting-bed cylindrical was to render said bed adjustable about its axis, so as to bring all parts of its periphery in succession beneath the edge of the knife, thus adding greatly to its durability; but a serious trouble has been experienced in securing a bed-roll in position with sufficient firmness to prevent it being partially revolved and thrown out of position by the pressure of the knife thereon when said roll has become reduced in size by wear or shrinking, so that its axis is not directly beneath the edge of the knife, and the object of my present invention is to obviate this objection, and to this end I form in the upper surface of the machine-table 2, upon which the paper to be cut is placed in a pile in the usual manner, a groove 3, which extends from side to side of the machine beneath the knife 4, the side walls of which groove are preferably slightly inclined to a perpendicular, as shown at 5 and 6, so that said groove is wider at the bottom than at the top, and in said groove I place the two bars 7 and 8, the inner or opposing sides of which have formed therein longitudinal grooves nearly semicircular in cross-section, said semicircular grooves having radii exactly equal to the semidiameter of the wooden cylinder or rod 9, which is placed between said bars, as shown. A third bar 10 is placed in said groove 3 between the bar 7 and the front wall 5 of the groove 3. A plurality of pockets or recesses 11 communicate with the groove 3 and extend to the bottom thereof, as shown in Fig. 2. The bar 10 has fitted to threaded holes therein a plurality of set-screws 12, corresponding in number to the number of the recesses 11, by means of which the bar 7 may be moved toward the bar 8, so as to firmly clamp the cylindrical cutting-bed roll 9 between the two bars 7 and 8, with its extreme lower portion resting on the bottom of the groove 3, said bed-roll being entirely inclosed by the grooved sides of the bars 7 and 8, except at the top, where it projects slightly above the level of the upper surfaces of the table 2 and bars 7 and 8. By this construction and arrangement of the cutting-bed roll and the clamping devices for holding it in position said roll is firmly secured in its desired position, but may be readily and easily adjusted to a new position by simply slackening the set-screws 12, turning said roll, and then tightening said set-screws again to firmly clamp said roll between the bars 7 and 8, or the roll may be removed when the set-screws 12 are slackened by first lifting out the bar 10 and then removing the bar 7.

The bar 8, as shown in Fig. 2, remains in a fixed position in contact with the rear side wall of the groove 3; but it may be formed in one piece with the table 2, if desired, or, in other words, the rear wall of the groove 3 may have a nearly semicircular outline when viewed in vertical section without departing from the principles of my invention; but as a convenience in the manufacture of the parts I prefer to form the rear semicircularly-grooved wall of the groove 3 in a separate piece of metal from the table, as shown in Fig. 2.

I claim—

1. In a cutting-bed for paper-cutting machines, the combination of a work-supporting table provided with a bed-groove extending from side to side thereof, the front and rear walls of which are slightly inclined or undercut, and provided with a plurality of pockets or recesses extending from its front side; a pair of detachable bars fitted to said bed-groove, said bars having their inner or adjacent faces grooved longitudinally to fit the periphery of the cutting-bed roll; a cylindrical bed-roll placed between said grooved bars, in position to be clamped thereby; another bar placed in said bed-groove in contact with its front wall; and a plurality of set-screws threaded in said front bar and impinging upon the front grooved bar as set forth.

2. In a cutting-bed for paper-cutting machines, the combination of a work-supporting table provided with a bed-roll-receiving groove extending from side to side thereof; a pair of removable bars fitted in and extending lengthwise of said groove, said bars having their adjacent faces grooved longitudinally to accurately fit sections of a cylindrical bed-roll; a cylindrical bed-roll located between said grooved bars; a third bar placed in the groove in said table in contact with its front wall; a plurality of pockets formed in the upper side of said table and communicating with said table-groove; and a plurality of set-screws threaded in said third bar and impinging upon one of said grooved bars as and for the purpose described.

In testimony whereof I have signed my name to this specification, in the presence of two subscribing witnesses, on this 21st day of June, A. D. 1902.

BENJAMIN F. DE COSTA.

Witnesses:
N. C. LOMBARD,
DANIEL A. HAZEN.